US006860384B2

United States Patent
Baumeister et al.

(10) Patent No.: US 6,860,384 B2
(45) Date of Patent: Mar. 1, 2005

(54) FEED DEVICE FOR CONVEYOR BELTS LOADED WITH PICK-AND-PLACE COMPONENTS

(75) Inventors: Andre Baumeister, Holzgerling (DE); Thomas Liebeke, Kolbermoor (DE); Herbert Wallner, Schönaich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/381,848
(22) PCT Filed: Sep. 20, 2001
(86) PCT No.: PCT/DE01/03640
§ 371 (c)(1), (2), (4) Date: Mar. 28, 2003
(87) PCT Pub. No.: WO02/26600
PCT Pub. Date: Apr. 4, 2002

(65) Prior Publication Data
US 2004/0031665 A1 Feb. 19, 2004

(30) Foreign Application Priority Data
Sep. 29, 2000 (DE) .......................................... 100 48 458

(51) Int. Cl.⁷ .......................... B65G 47/84; F16H 55/24
(52) U.S. Cl. ...................................... 198/835; 198/832.1
(58) Field of Search ............................... 198/832.1, 834, 198/835

(56) References Cited

U.S. PATENT DOCUMENTS

| 3,538,675 | A |   | 11/1970 | Schmitz |
| 3,923,151 | A | * | 12/1975 | Weber .................... 198/810.04 |
| 5,878,805 | A | * | 3/1999 | Witschi et al. ............... 164/430 |
| 6,164,437 | A | * | 12/2000 | Brown et al. ............. 198/832.1 |
| 6,273,235 | B1 | * | 8/2001 | Inoue .......................... 198/330 |
| 6,325,204 | B1 | * | 12/2001 | Zurcher ....................... 198/792 |
| 6,446,791 | B1 | * | 9/2002 | Goller et al. ............. 198/832.1 |
| 6,564,665 | B1 | * | 5/2003 | Hormann ...................... 74/416 |

FOREIGN PATENT DOCUMENTS

| DE | 69424379 | 6/1995 |
| DE | 19606391 | 8/1997 |
| DE | 19906222 | 9/2002 |

* cited by examiner

Primary Examiner—Douglas Hess
(74) Attorney, Agent, or Firm—Harness, Dickey & Pierce, P.L.C.

(57) ABSTRACT

A feed device is for a conveyor belt loaded with pick-and-place components. The feed device includes at least one transport wheel which can be coupled with the conveyor belt to move the conveyor belt, and a drive device coupled with a transport wheel. The transport wheel is provided with a control mechanism whose input shaft and output shaft cross.

30 Claims, 1 Drawing Sheet

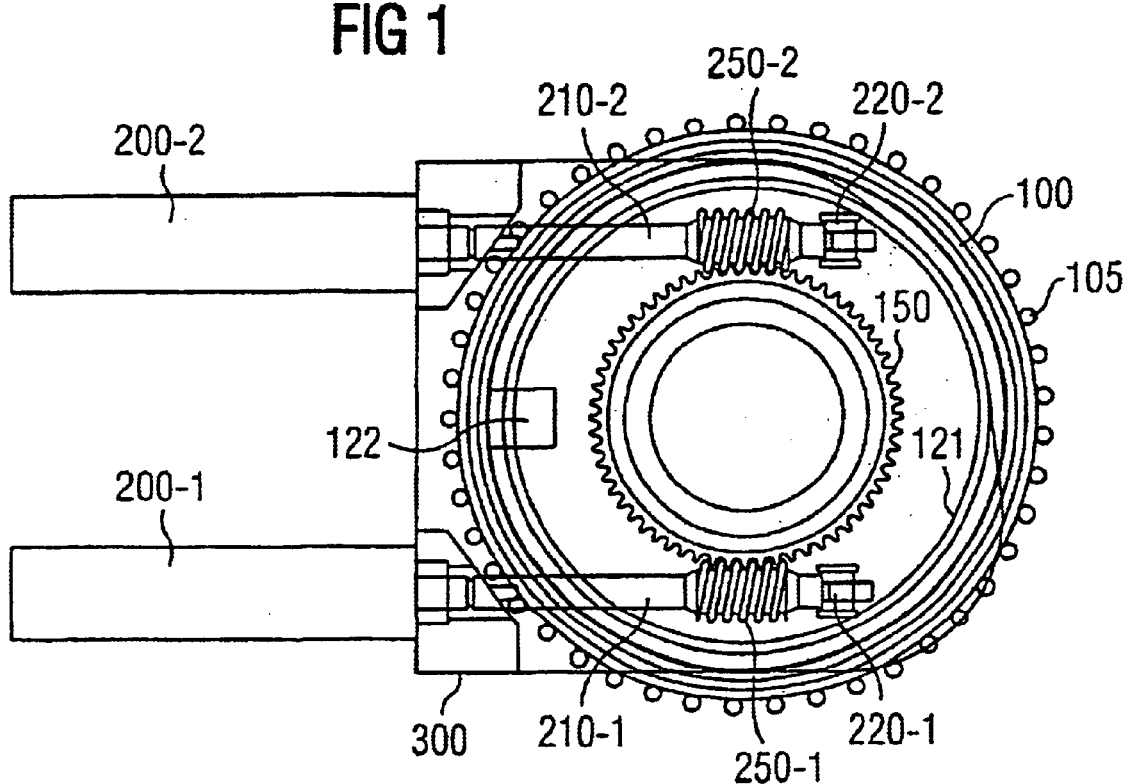
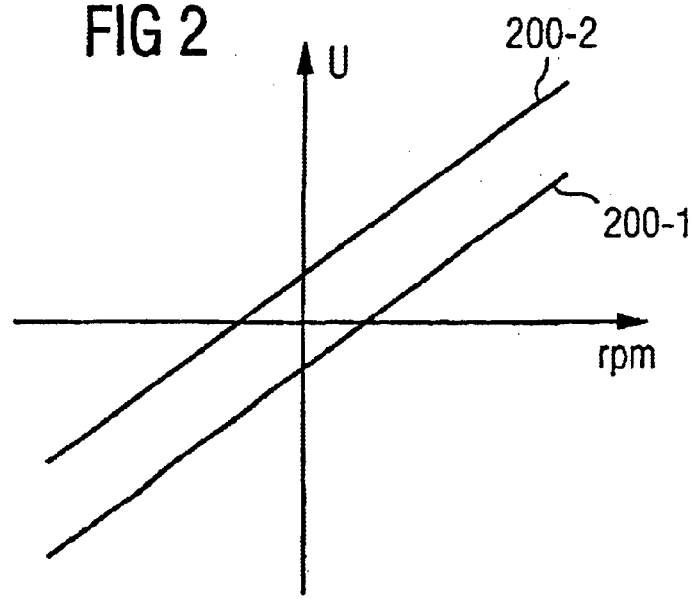

FEED DEVICE FOR CONVEYOR BELTS LOADED WITH PICK-AND-PLACE COMPONENTS

This application is the national phase under 35 U.S.C. § 371 of PCT International Application No. PCT/DE01/03640 which has an International filing date of Sep. 20, 2001, which designated the United States of America and which claims priority on German patent application number DE 100 48 458.1 filed Sep. 29, 2000, the entire contents of which are hereby incorporated herein by reference.

FIELD OF THE INVENTION

The invention generally relates to a feed device for conveyor belts loaded with pick and place elements or components. Preferably, it relates to one having at least one transport wheel and a drive device coupled to the latter.

BACKGROUND OF THE INVENTION

Electronic components are, for example, provided arranged on conveyor belts. The conveyor belts are conventionally provided with a top layer which prevents the components falling off the conveyor belt. In order to be able to pick the components, for example arranged on the conveyor belt, and place them on a printed circuit board, the top layer must be removed. By this, the components are gradually liberated, in order to be removed from the conveyor belt and placed on a printed circuit board via a handling device, such as a pick and place head of a pick and place apparatus.

Since the components are becoming smaller and smaller and already currently have very small dimensions, it is necessary to position the conveyor belt with the components arranged thereon correspondingly accurately. For this purpose, use has hitherto been made of feed devices which, for example, first transported the conveyor belt forward, pulling off the top layer and liberating the components, and then positioned the conveyor belt accurately by use of a mechanical stop, against which the drive device had moved the transport wheel or the mechanism used to couple the drive device to the transport wheel. In this case, however, jolting movements of the conveyor belt occur, as a result of which the components can fall off the conveyor belt before they can be removed from the conveyor belt by the pick and place head of the pick and place apparatus.

In order to prevent the components falling off the conveyor belt, a hold-down apparatus for the components has been used. This held the components in the pockets in the conveyor belt until the components were removed via a pick and place head. However, the hold-down apparatus meant a great deal of mechanical expenditure, and was susceptible to defects and slows down the feed cycle of the pick and place elements. Furthermore, in conventional feed devices, the jolting movements of the conveyor belt are undesired, since pick and place elements can fall off the conveyor belt in spite of the hold-down apparatus.

SUMMARY OF THE INVENTION

There is therefore the need for a feed device by which exact positioning and feeding of conveyor belts loaded with pick and place elements is simply and reliably possible.

According to an embodiment of the invention, a feed device for conveyor belts loaded with pick and place components is provided which has at least one transport wheel and a drive device coupled to the latter. The transport wheel can be coupled to the conveyor belt in order to move it. Furthermore, the transport wheel is provided with a control mechanism whose input shaft and output shaft cross. This achieves the situation where the control mechanism is self-locking, so that, via the control mechanism, the movement of the drive device and therefore the movement of the transport wheel which drives the conveyor belt can be controlled.

The control mechanism can be, for example, a worm gear mechanism or a screw gear mechanism. A worm gear mechanism of this type can have a worm gear which is formed on the transport wheel and through which the output shaft runs, and a control spindle which engages in the worm gear and through which the input shaft runs.

Furthermore, a control apparatus can be provided by which the movement of the transport wheel driven by the drive device can be controlled by use of the control mechanism. The control apparatus can have a control drive which is coupled to the control mechanism and from which power can be taken or power can be output via a control shaft.

The control drive can be an electrical drive. This makes it possible, by use of an electronic control apparatus, to use suitable control methods for controlling the movement of the transport wheel.

The control shaft of the control drive can coincide with the input shaft of the control mechanism. For example, the control shaft of the control drive can be connected directly to the control spindle of the control mechanism. This permits a reduced requirement for space for the control drive and the control mechanism.

Furthermore, the drive device of the transport wheel can be coupled to the transport wheel via a drive spindle which, in addition to the control spindle, engages in the worm gear of the control mechanism. A further reduction in overall size is made possible by this.

By way of the control apparatus, the rotational speed and/or the power of the control drive can be controlled as a function of the rotational speed and/or the power of the drive device.

The control drive can furthermore be controllable by way of the control apparatus as the drive of the transport wheel. This makes it possible to drive the transport wheel both with the drive device of the transport wheel and with the control apparatus via the control mechanism. In this case, higher power outputs to the transport wheel and therefore faster transport of the conveyor belt are possible than if the transport wheel were driven only by the drive unit.

The transport wheel can be provided with an encoder in order to register its position, and the feed device can have a sensor, by which the encoder can be sensed.

The drive device and the control drive are preferably constructed identically. In this way, the construction of the feed device according to an embodiment of the invention and its design and development are simplified and benefited.

BRIEF DESCRIPTION OF THE DRAWINGS

The invention will be explained in more detail with reference to the drawings, in which:

FIG. 1 shows a schematic plan view of a preferred embodiment of the invention, and FIG. 2 shows a graph which reveals a course of a voltage applied to a drive device and a control drive of the preferred embodiment of the invention as a function of the rotational speed.

DETAILED DESCRIPTION OF THE PREFERRED EMBODIMENTS

As FIG. 1 reveals, the preferred embodiment of the invention has a transport wheel 100, a control drive 200-1 and a drive device 200-2. The drive device 200-2, the control drive 200-1 and the transport wheel 100 are arranged on a base plate 300. The transport wheel 100 has a plurality of transport pins 105, which are formed distributed on the circumference of the transport wheel 100 and are used to engage in transport openings which are formed in the conveyor belt, which can be transported by the feed device according to an embodiment of the invention. The transport wheel 100 is also provided with a worm gear 150. A control spindle 250-1 and a drive spindle 250-2 engage in the worm gear 150. The control spindle 250-1 is connected to the control drive 200-1 via a control shaft 210-1.

A bearing 220-1 for the control shaft 210-1 is provided on the base plate 300. The drive spindle 250-2 is connected to the drive device 200-2 via an input shaft 210-2. A bearing apparatus 220-2 for the input shaft 210-2 is provided on the base plate 300.

The simultaneous engagement of the control spindle 250-1 and the drive spindle 250-2 in the worm gear 150 makes it possible to construct the feed device according to an embodiment of the invention with very small dimensions in the axial direction. As a result, the feed device according to an embodiment of the invention is particularly suitable for narrow conveyor belts.

The control drive 200-1 and the drive device 200-2 can, for example, be constructed identically, so that if required the control drive 200-1 can be used to drive the transport wheel 100 in addition to the drive device 200-2.

FIG. 2 reveals a graph of an example of a course of the voltages which are applied to the control drive 200-1 and the drive device 200-2 as a function of the rotational speed. As can be seen from FIG. 2, the magnitude of that voltage which is applied to the drive device 200-2 is higher by a constant difference than the magnitude of the voltage which is applied to the control drive 200-1.

Thus, as the transport wheel 100 is driven, the driving action via the drive device 200-2, the input shaft 210-2, the drive spindle 250-2 and the worm gear 150 is provided without play, since the drive device 200-2 is supplied with more energy than the control drive 200-1, by which any play possibly present between the drive spindle 250-2 and the worm gear 150 or the control spindle 250-1 and the worm gear is compensated for.

However, it is also possible to use a different relation between the power and/or the rotational speed of the control drive and the power and/or the rotational speed of the drive device 200-2. For example, the control drive 200-1 and the drive-device 200-2 can be supplied with the same power or operated at the same rotational speed, so that it is possible to drive the transport wheel 100 with twice the drive power.

At a changeover from drive operation to positioning operation, it is possible to switch over to the aforementioned different supply of drive device 200-2 and control drive 200-1, so that play-free positioning of the transport wheel 100 and thus of the conveyor belt which holds the components is possible. The transport wheel 100 can be provided with an encoder 121, for example with a lined disc. The encoder 121 can be sensed by use of a sensor 122. The sensor 122 can be connected to the control apparatus, by which highly accurate positioning of the transport wheel 100 and therefore of a conveyor belt coupled to the latter is then possible. Furthermore, by use of the encoder 121 together with the sensor 122 and the control apparatus, it is possible to control the movement of the transport wheel 100 highly accurately in a closed control loop.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A feed device for conveyor belts including pick and place components, comprising:
    at least one transport wheel, coupled to a conveyor belt to move the conveyor belt; and
    a drive device coupled to the transport wheel, wherein a control mechanism is provided on the transport wheel and includes a crossing input shaft and output shaft.

2. The feed device as claimed in claim 1, wherein the control mechanism is a worm gear mechanism, including a worm gear formed on the transport wheel and through which the output shaft runs, and including a control spindle adapted to engage in the worm gear and through which the input shaft runs.

3. The feed device as claimed in claim 2, wherein the movement of the transport wheel driven by the drive device is controlled by a control apparatus, operatively connected to the control mechanism.

4. The feed device as claimed in claim 2, wherein the drive device is coupled to the transport wheel via a drive spindle, adapted to engage in the worm gear of the control drive.

5. The feed device as claimed in claim 2, wherein the transport wheel includes an encoder and wherein the feed device includes a sensor for sensing the encoder.

6. The feed device as claimed in claim 1, wherein the movement of the transport wheel driven by the drive device is controlled by a control apparatus, operatively connected to the control mechanism.

7. The feed device as claimed in claim 6, wherein the control apparatus includes a control drive coupled to the control mechanism and from which power is adapted to, at least one of, be taken from and output via a control shaft.

8. The feed device as claimed in claim 7, wherein the control drive is an electric drive.

9. The feed device as claimed in claim 8, wherein the control shaft of the control drive coincides with the input shaft of the control mechanism.

10. The feed device as claimed in claim 8, wherein the drive device and the control drive are constructed identically.

11. The feed device as claimed in claim 7, wherein the control shaft of the control drive coincides with the input shaft of the control mechanism.

12. The feed device as claimed in claims 11, wherein the control apparatus is able to control at least one of the rotational speed and the power of the control drive as a function of the at least one of rotational speed and the power of the drive device.

13. The feed device as claimed in claim 11, wherein the drive device and the control drive are constructed identically.

14. The feed device as claimed in claim 7, wherein the drive device and the control drive are constructed identically.

15. The feed device as claimed in claim 7, wherein the drive device is coupled to the transport wheel via a drive spindle, adapted to engage in a worm gear of the control drive.

16. The feed device as claimed in claim 15, wherein the drive device and the control drive are constructed identically.

17. The feed device as claimed in claims 7, wherein the control apparatus is able to control at least one of the rotational speed and the power of the control drive as a function of the at least one of rotational speed and the power of the drive device.

18. The feed device as claimed in claim 17, wherein the drive device and the control drive are constructed identically.

19. The feed device as claimed in claim 7, wherein the transport wheel includes an encoder and wherein the feed device includes a sensor for sensing the encoder.

20. The feed device as claimed in claim 19, wherein the drive device and the control drive are constructed identically.

21. The feed device as claimed in claims 6, wherein the control apparatus is adapted to control at least one of the rotational speed and the power of the control drive as a function of the at least one of rotational speed and the power of the drive device.

22. The feed device as claimed in claim 21, wherein the control apparatus is adapted to control the control drive as the drive of the transport wheel.

23. The feed device as claimed in claim 6, wherein the drive device is coupled to the transport wheel via a drive spindle, adapted to engage in a worm gear of the control drive.

24. The feed device as claimed in claim 6, wherein the transport wheel includes an encoder and wherein the feed device includes a sensor for sensing the encoder.

25. The feed device as claimed in claim 1, wherein the drive device is coupled to the transport wheel via a drive spindle, adapted to engage in a worm gear of the control drive.

26. The feed device as claimed in claim 1, wherein the transport wheel includes an encoder and wherein the feed device includes a sensor for sensing the encoder.

27. A feed device for conveyor belts including components, comprising:
at least one transport means, coupled to a conveyor belt, for moving the conveyor belt; and
drive means for driving the transport means, wherein a control mechanism is provided on the transport means and includes a crossing input shaft and output shaft.

28. The feed device as claimed in claim 27, wherein the control mechanism includes a worm gear mechanism, further including a worm gear formed on the transport means and through which the output shaft runs, and further including a control spindle adapted to engage in the worm gear and through which the input shaft runs.

29. The feed device as claimed in claim 27, further comprising:
control means for controlling the movement of the transport means, driven by the drive means, operatively connected to the control mechanism.

30. The feed device as claimed in claim 29, wherein the control means includes a control drive coupled to the control mechanism and from which power is adapted to, at least one of, be taken from and output via a control shaft.

* * * * *